United States Patent [19]

Appeldorn et al.

[11] Patent Number: 5,575,550
[45] Date of Patent: Nov. 19, 1996

[54] POLE LIGHT HAVING A PROGRAMMABLE FOOTPRINT

[75] Inventors: Roger H. Appeldorn, Grant Township, Washington County; Sanford Cobb, Jr., Saint Mary's Point; John F. Dreyer, Jr., North Oaks, all of Minn.

[73] Assignee: Minnesota Mining and Manufacturing Company, Saint Paul, Minn.

[21] Appl. No.: 384,679

[22] Filed: Feb. 6, 1995

Related U.S. Application Data

[62] Division of Ser. No. 268,672, Jun. 30, 1994, abandoned, which is a continuation of Ser. No. 999,082, Dec. 31, 1992, abandoned.

[51] Int. Cl.$^6$ .................................................. F21V 8/00
[52] U.S. Cl. ........................... 362/32; 362/308; 362/327; 362/431; 40/547; 385/36; 385/901
[58] Field of Search ........................... 385/31, 32, 33, 385/36, 900, 901, 902, 123; 362/32, 327, 328, 431, 308, 309; 40/547, 560

[56] References Cited

U.S. PATENT DOCUMENTS

| | | | |
|---|---|---|---|
| 1,656,110 | 1/1928 | Foltis | 353/97 |
| 1,673,512 | 6/1928 | Hurter | 353/97 |
| 1,746,921 | 2/1930 | Amyot | 40/560 |
| 2,351,238 | 6/1944 | Teuber | 40/560 |
| 2,688,947 | 9/1954 | Zorn | 40/560 |
| 2,726,571 | 12/1955 | Chang | 40/560 |
| 3,536,908 | 10/1970 | Oster | 362/32 |
| 3,671,735 | 6/1972 | King | 40/560 |
| 4,012,630 | 3/1977 | Gareis | 362/32 |
| 4,052,120 | 10/1977 | Sick et al. | 385/36 |
| 4,084,339 | 4/1978 | Peltier | 40/560 |
| 4,260,220 | 4/1981 | Whitehead | 385/133 |
| 4,360,863 | 11/1982 | Barnes et al. | 362/346 |
| 4,615,579 | 10/1986 | Whitehead | 385/133 |
| 4,648,695 | 3/1987 | Mizutani et al. | 353/97 |
| 4,712,867 | 12/1987 | Malek | 359/539 |
| 4,750,798 | 6/1988 | Whitehead | 385/133 |
| 4,779,176 | 10/1988 | Bornhorst | 40/560 |
| 4,795,227 | 1/1989 | Chande | 385/33 |
| 4,805,984 | 2/1989 | Cobb, Jr. | 385/133 |
| 4,883,333 | 11/1989 | Yanez | 385/901 |
| 4,906,070 | 3/1990 | Cobb, Jr. | 359/834 |
| 4,924,612 | 5/1990 | Kopelman | 40/547 |
| 4,933,822 | 6/1990 | NakaMats | 362/431 |
| 4,947,292 | 8/1990 | Vlah | 362/32 |
| 4,952,023 | 8/1990 | Bradshaw et al. | 359/529 |
| 4,955,975 | 9/1990 | Mori | 362/32 |
| 4,989,948 | 2/1991 | Dreyer, Jr. | 359/515 |
| 5,040,883 | 8/1991 | Cobb, Jr. | 359/742 |
| 5,067,831 | 11/1991 | Robbins et al. | 385/123 |
| 5,095,415 | 3/1992 | Anderson et al. | 362/329 |
| 5,102,227 | 4/1992 | Zwirner | 362/32 |
| 5,134,550 | 7/1992 | Young | 362/32 |
| 5,246,019 | 9/1993 | Godfrey et al. | 132/208 |

FOREIGN PATENT DOCUMENTS

0290266  11/1988  European Pat. Off. .

Primary Examiner—Denise L. Gromada
Assistant Examiner—Alan B. Cariaso
Attorney, Agent, or Firm—Gary L. Griswold; Walter N. Kirn; Stephen W. Buckingham

[57] ABSTRACT

The present invention provides a pole light for directing or delivering light in a desired pattern to a surface proximate to the pole light. The present invention also provides a method for lighting a plurality of desired regions on a surface in a precise and predetermined pattern useful, for example, as a traffic management and guidance system.

6 Claims, 5 Drawing Sheets

POLE LIGHT HAVING A PROGRAMMABLE FOOTPRINT

This is a division of application Ser. No. 08/268,672 filed Jun. 30, 1994 now abandoned which is a continuation of application Ser. No. 07/999,082 filed Dec. 31, 1992 now abandoned.

TECHNICAL FIELD

The present invention relates to pole lights, and particularly to pole lights having a programmable footprint such that light is directed or delivered to a surface in a precise and predetermined pattern.

BACKGROUND OF THE INVENTION

Roadways, parking lots, sidewalks, and other areas are often illuminated by means of a pole light, having a source of light suspended at the top of a tall pole. Pole lights may also provide the source of light at the bottom of the pole with the light distributed by a device at the top of the pole in a broad uniform pattern to the adjacent surfaces. See U.S. Pat. No. 4,989,948.

In addition to providing general area lighting to an area, such as a roadway, there are many specific applications in which lights are used to aid in directing traffic or providing extra illumination to a portion of a roadway, such as to an entrance or exit ramp. Additional lighting is often provided at an exit or entrance ramp so that the ramp is easily seen and negotiated by the motorist. Some intersections are also well illuminated, particularly so that the turn lanes are easily identifiable. Likewise, branches or convergences in highways or other roadways, are often well lit.

In addition to lighting a roadway, traffic is often assisted by means of lane markings, raised pavement markers, and the like, designed to be illuminated by the headlights of vehicles. For example, an exit lane may be marked with raised pavement markers to guide the motorist onto the exit ramp. Reflective paint may also be used to guide the motorist in a particular direction on a roadway, or to provide information to the motorist, such as "stop ahead" or "speed 55." Such systems are used extensively, but function inadequately in inclement weather conditions, such as, snow, fog, rain, or ice.

Likewise, there are disadvantages to the use of pole lights, used to distribute light in a broad pattern. Commonly used pole lights have the disadvantage of distributing light in unwanted directions. Light pollution is a serious problem, and has been the subject of governmental regulation. For example, at a residential street corner, a corner pole light may adequately light the intersection, but also provides additional stray light to the surrounding homes or businesses. In an intersection it is often only a small portion of the intersection that must be brightly lit, (e.g., only the left turn lane), but to accomplish the illumination of the desired area the entire intersection and surrounding property is illuminated. It would be desirable to be able to illuminate only the left turn lane, or other predetermined portion of the intersection, often only for a predetermined time, e.g. when the left turn arrow is illuminated.

Also, exit or entrance ramps that are illuminated would desirably only have the ramp illuminated, rather than illuminating all of the property surrounding the ramp. Presently, about 20 acres surrounding an entrance/exit ramp is illuminated, while there is typically about an acre or less of actual roadway.

It would also be desirable to provide light in a predetermined shape or pattern, such as in the shape of an arrow, a lane delineator, or to provide information, to avoid the need for using reflective paint or markers that are often obscured by inclement weather conditions.

SUMMARY OF THE INVENTION

The present invention provides a pole light for directing or delivering light in a desired pattern to a surface proximate to the pole light. The present invention also provides a method for lighting a plurality of desired regions on a surface in a precise and predetermined pattern useful, for example, as a traffic management and guidance system.

The pole light of the present invention comprises:
a) a light conduit having a proximate end and a distal end, said proximate and distal ends typically corresponding to proximate and distal ends of the pole light; b) an area source of quasi-collimated light provided near the distal end of said light conduit; and c) a light distributing member, further distal from the area source of light, that distributes the light emanating from the area source of light to illuminate a surface proximate to the pole light in a precise and predetermined pattern, e.g. in the shape of a line, an arrow, a left turn lane, or other shape or pattern. The proximate end of the pole light may mount on a surface and extend from the surface, typically in a generally perpendicular direction from the surface. Many other means of mounting the pole light are also acceptable. "Pole light", as used herein, is not limited to a pole extending from the ground, but includes light conduits provided in any suitable configuration, and mounted in a wide variety of ways.

The present invention provides three general embodiments for light distributing members. The first embodiment provides a light mask, adapted to block a specific portion of the light emanating from the area source of light, and permitting only a desired portion of the light to enter the light distributing member. The light distributing member also includes one or more lenses and optionally one or more reflective elements. The portion of light that is permitted to pass through the mask is focused by the one or more lenses, and optionally reflected by the one or more reflective elements, to provide the desired precise and predetermined pattern on a surface proximate to the pole light. The reflective elements may have optical power.

In a second embodiment, the light distributing member comprises a plurality of prismatic elements, positioned relative to one another so as to focus the area source of light in a precise and predetermined pattern on a surface proximate to the pole light. Optional reflective members may also be utilized to reflect the light focused by the plurality of prismatic elements.

The present invention also provides a light distributing member that comprises a) a primary light conduit and one or more auxiliary light conduits, typically extending generally perpendicular from the primary light conduit; b) one or more reflective elements to reflect the area source of light emanating from the primary light conduit into said one or more auxiliary light conduits; and c) one or more reflective elements positioned adjacent to light exit ports provided in said auxiliary light conduit. The reflective elements positioned adjacent the light exit ports may also include one or more lenses to focus the light reflected from the reflective members. Preferably, a plurality of reflective members and light exit ports are provided in the auxiliary light conduit, and preferably the reflective members are total internal reflection prisms. A lens may also be combined with the total internal reflection prism.

The method of the present invention is useful as a traffic management and guidance system, and is capable of lighting a plurality of desired regions on a surface in a precise predetermined, and programmable pattern. The method comprises the step of: providing a plurality of pole lights, as described above, arranged in a pattern that illuminates a plurality of desired regions in a precise pattern on a surface, wherein the light from each respective pole light provides a portion of the total predetermined and precise pattern on the surface.

As used herein, "precise" is defined as a pattern of light having a boundary or edge discernible to the viewer.

DETAILED DESCRIPTION OF THE PRESENT INVENTION

Figure 1:
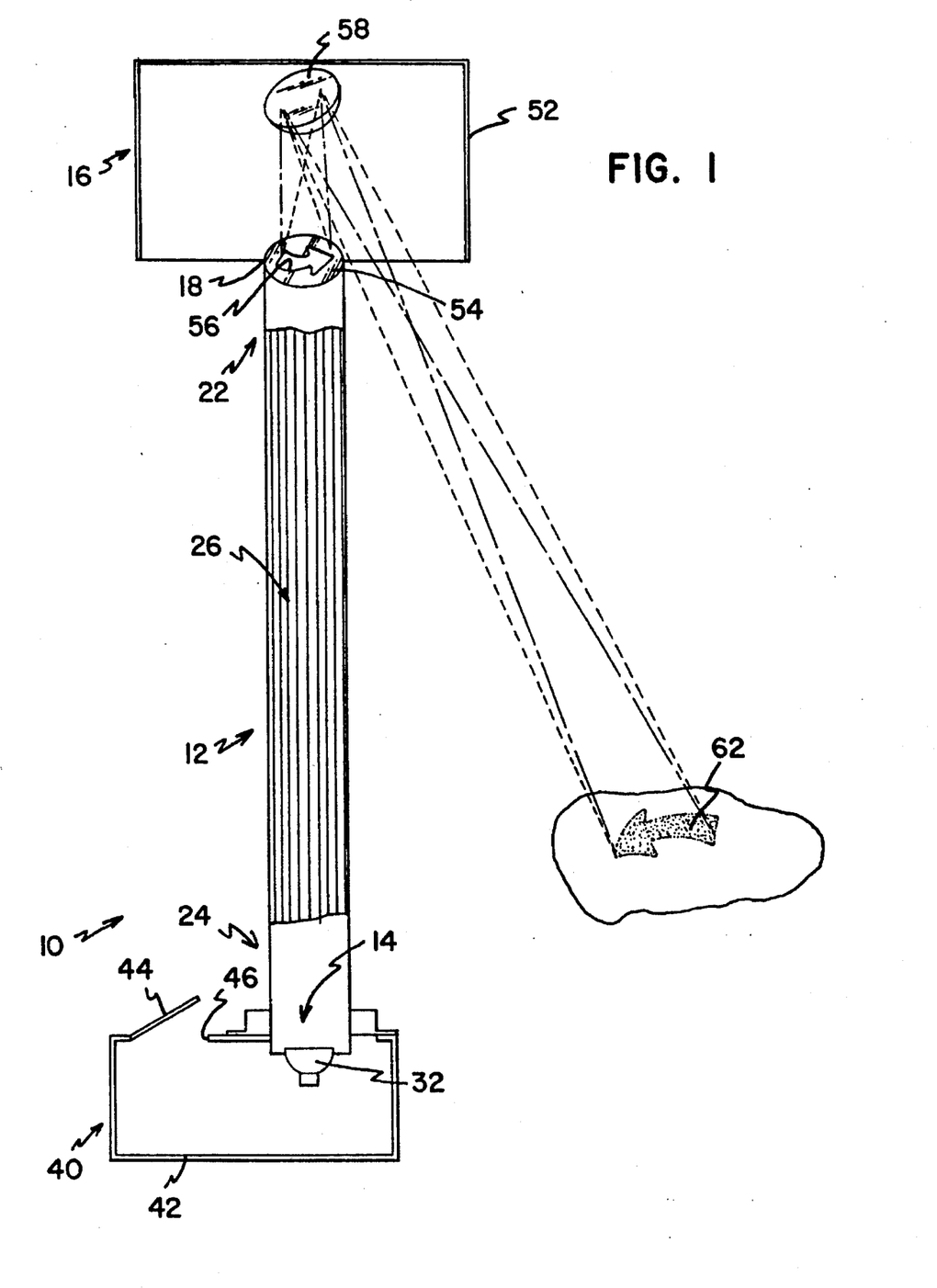
FIG. 1 is a schematic cross-section of a pole light of the invention.

Referring to FIG. 1, a pole light 10 is shown. Pole light 10 includes a columnar light conduit 12, a light source 14, and a light distributing chamber 16. The light distributing chamber 16 includes a light inlet 18. Columnar light conduit 12 has a distal end 22 and a proximate end 24, and a light transporting sheeting material 26. The light source 14 includes a light bulb 32. The light source 14 and the proximate end 24 of the conduit 12 are provided in a base-portion 40. The base portion 40 includes an access box 42, having a door 44 and an access opening 46. The light distributing chamber 16 includes a housing 52, a light shield 54 having an opening 56, and a mirror 58.

A surface proximate to the pole light 10 is shown having an image 62 thereon.

Figure 2:
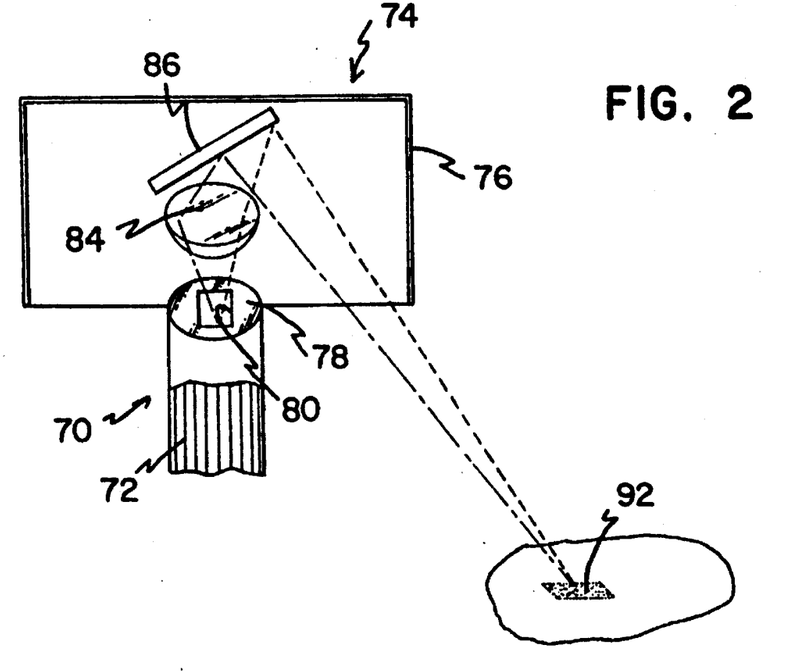
FIG. 2 is a fragmentary schematic cross-section of a pole light of the invention.

Referring to FIG. 2, a pole light 70 is shown. Pole light 70 includes a light conduit 72 and a light distributing chamber 74. The light distributing chamber includes a housing 76. In the housing 76 are a shield 78 having an opening therein 80, a lens 84, and a reflective member 86. A surface proximate to the pole light 10 is shown having an image 92 thereon.

Figure 3:
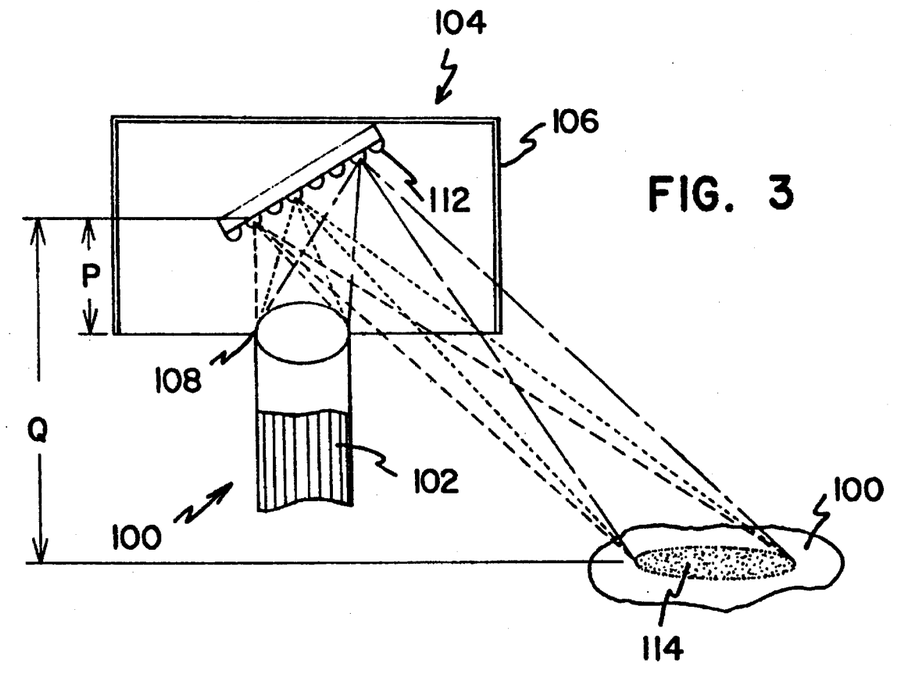
FIG. 3 is a fragmentary schematic cross-section of a pole light of the invention.

Referring to FIG. 3, a pole light 100 is shown. The pole light 100 includes a light conduit 102 and a light distributing chamber 104. The light distributing chamber 104 includes a housing 106, a light inlet 108 providing an area source of light, emanations therefrom and a plurality of prismatic elements such as prismatic element 212. A surface proximate to the pole light 100 is shown having an image 114 thereon. The distance between the area source of light and prismatic element 112 is designated "p", the (vertical?) distance between prismatic element 112 and where it strikes the surface 114 is designated "q". The focal length of the prismatic element 112 is "f". The relationship between the focal length of the prismatic element is defined by the formula $1/f=1/p+1/q$.

Figure 4:
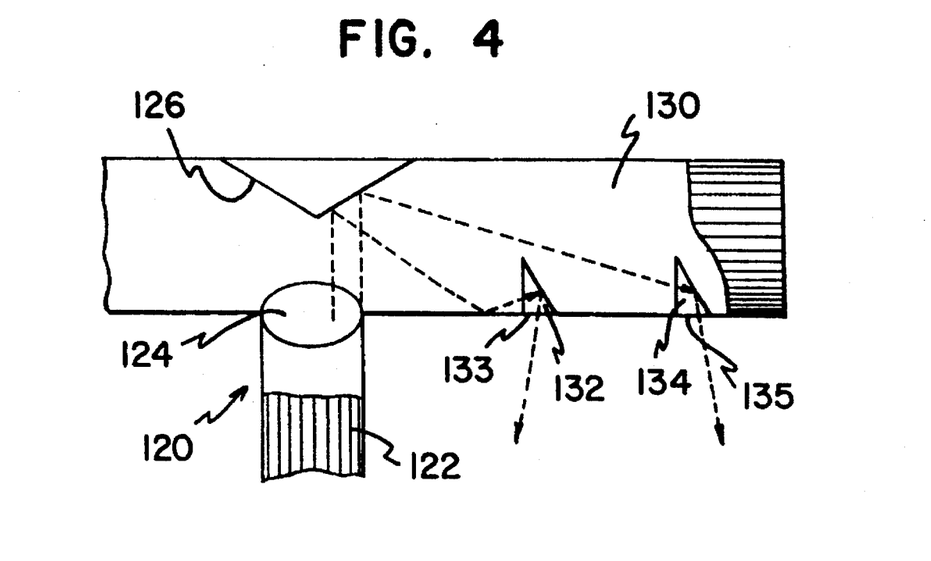
FIG. 4 is a fragmentary schematic cross-section of a pole light of the invention.

Referring to FIG. 4, a pole light 120 is shown. The pole light 120 includes a primary light conduit 122 and an auxiliary light conduit 130. The pole light 120 also includes an inlet 124 from which an area source of light emanates into the auxiliary light conduit 130, and a reflective member 126. The auxiliary light conduit 130 includes total internal reflecting members 132 and 134 each respectively placed adjacent to light ports 133 and 135.

Figure 5:
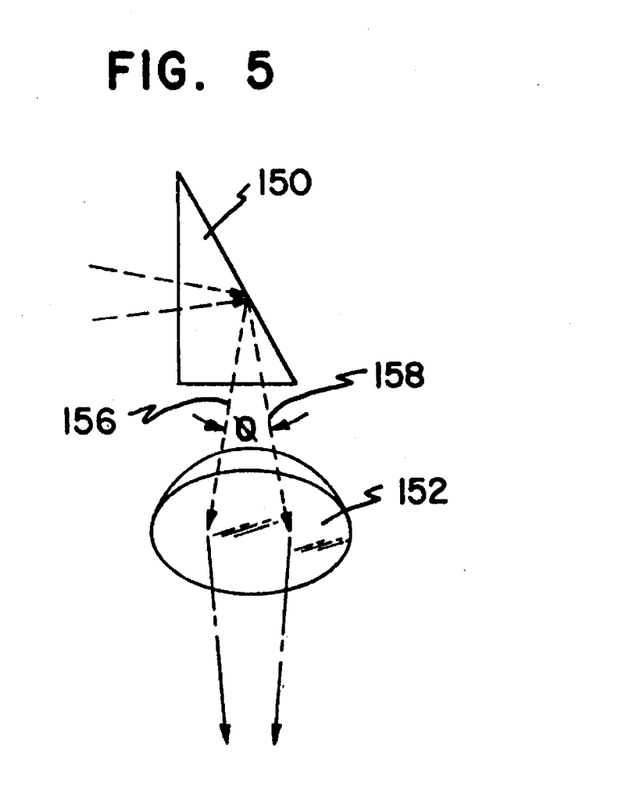
FIG. 5 is a fragmentary schematic cross-section of the total internal reflection members as shown in a pole light of FIG. 4.

Referring to FIG. 5, a total internal reflective member 150 is shown adjacent a lens 152. Light rays 154 and 155 are shown entering the member 150 with two light rays 156 and 158 refracted therefrom at an angle $\phi$. The light rays 156 and 158 are focused towards a surface by lens 152. The total internal reflective member 150 may optionally be integral with the lens 152.

Figure 6:
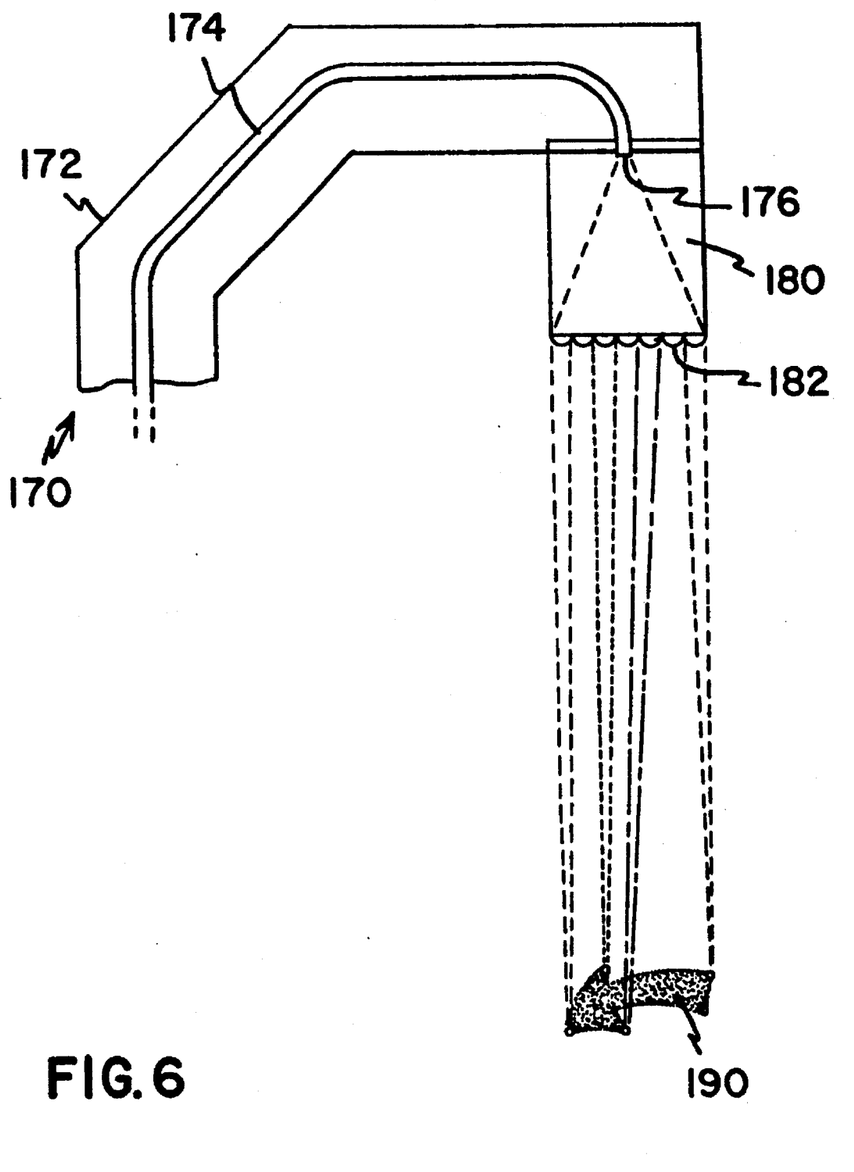
FIG. 6 is a fragmentary schematic cross-section of a pole light of the invention.

Referring to FIG. 6, a pole light 170 is shown. The pole light 170 includes a light housing 172 having a light conduit 174 therein. The light conduit 174 has an opening 176 from which an area source of light emanates into a light distributing chamber 180. The light distributing chamber 180 includes a plurality of prismatic elements 182. The prismatic elements 182 focus the area source of light onto a surface adjacent the light pole 170 in the shape of an arrow 190.

The present invention is useful in a wide variety of applications where light is desired in a predetermined shape or region on a roadway or other surface. Examples of useful applications for the present invention include, but are not limited to, the following: a) illuminating a left turn lane, including illuminating the lane only when the green left turn lane indicator is activated; b) illuminating a lane of travel on a roadway, by defining the path of travel, e.g., by a line down the middle of the lane, lines on either side of the lanes, or otherwise; c) illuminating an exit or entrance ramp along with the lane leading up to the ramp or leading from the ramp back into the roadway; d) illuminating a pathway into a parking ramp, with a changeable path indicating the direction towards the available parking spaces; e) illuminating a surface with a color, such as red, indicating, for example, that the lane or roadway is closed; f) illuminating crosswalks, e.g. school zones; g) providing numeric or alphabetic indicia on the roadway, e.g. "55" or "stop"; h) illuminating retail, industrial, prison, or other specified, precise regions, without effecting adjacent areas with polluting light; i) providing light patterns visible to aircraft; and j) providing decorative lighting, such as in an art gallery or sculpture garden, where light is desired, for example, only on the piece of art.

A pole light of the present invention will include, in general, a light source, a light conduit, and a light distributing member.

Light Conduit

Totally internally reflecting light conduits for transporting light from one place to another are known in the art. U.S. Pat. No. 4,805,984 (the '984 patent) describes such a light conduit and is incorporated herein by reference. See also, U.S. Pat. Nos. 4,615,579, 4,750,798, and 5,067,831, which are all incorporated herein by reference.

In use, a light conduit transports light from a light source, including both artificial or solar energy, and transports the light from one end of the conduit to the other. Light conduits, such as those described in the '984 patent, can transport light with very little loss of light. In addition, the light provided at the distal end of a conduit, such as described in the '984 patent, is a quasi-collimated area source of light. Light is emanating in a predetermined direction from all points of the defined area source such that the cone of rays emanating from every point on the area source is narrow. Thus, a single light bulb or multiple light bulbs at the proximate end of the light conduit will provide an integrated area source of light at the distal end of the conduit.

Although there are a number of configurations of light conduits known in the art, light conduits such as those described in the '984 patent are preferred. A preferred light conduit will comprise a wall member of a transparent material, including a structured surface on one side and a smooth surface opposite the structured surface. At least a portion of the cross-section of the wall member lying in a smooth arcuate curve. For example, the wall member may have a substantially circular cross-section with the smooth surface disposed on the inner side of the wall member and the structured surface on the outside of the wall member. The structured surface includes a linear array of substantially right angled isosceles prisms arranged side-by-side, with the perpendicular sides of the prisms making an angle of approximately 45° with the tangent to the smooth surface opposite the structured surface. The prisms typically run parallel to the axis of the wall member extending continuously from one end to the other. In use, a predetermined portion of the light entering the light conduit within an acceptable angular range, is contained by total internal reflection as it travels along from the proximate end to the distal end of the light conduit.

Figure 7:
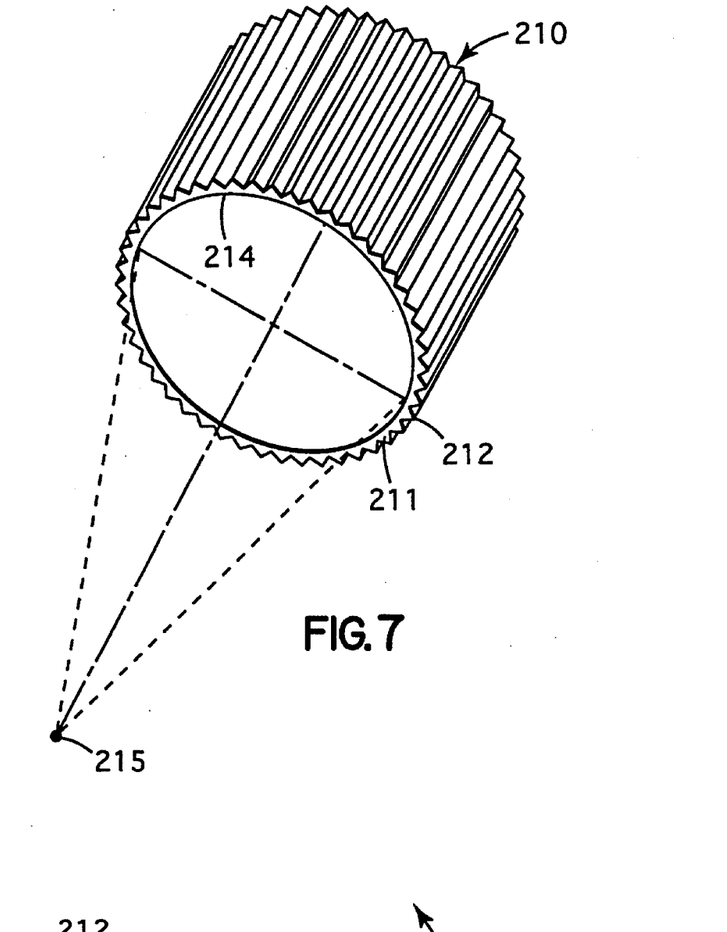
FIG. 7 is a perspective view of a light conduit of the present invention.
Figure 8:
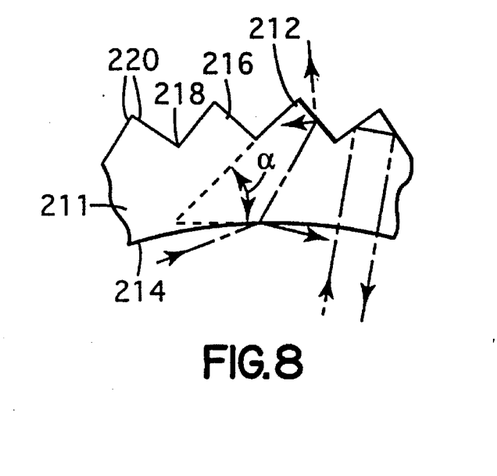
FIG. 8 is a fragmentary end view of the light conduit of FIG. 7.
Figure 9:
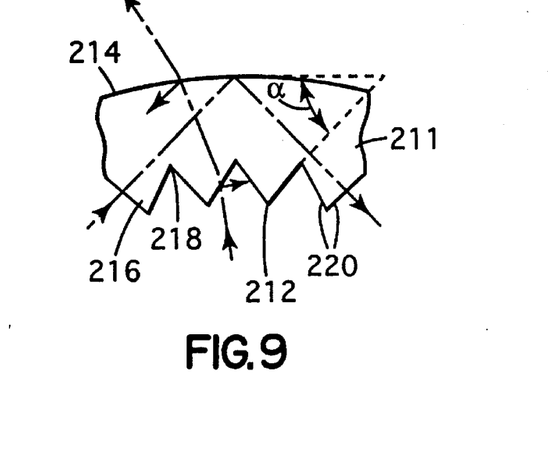
FIG. 9 is a fragmentary end view similar to FIG. 8 depicting the light conduit when the smooth surface is on the outer side.

Referring to FIG. 7 of the drawings, a hollow, tubular light conduit of the present invention, generally designated 210, may be used to transport and/or distribute a predetermined portion of light within the conduit. The light conduit includes a wall 211, of a transparent material, having a structured surface 212 on one side and a smooth surface 214 opposite the structured surface on the other side, and at least a portion of the cross-section of the wall lying in a smooth arcuate curve. Incident light from a light source 215 striking either of the surfaces 212 or 214, within an acceptable angular range, will be totally internally reflected at the other surface, as illustrated in FIGS. 8 and 9. The light will be totally internally reflected when the light refracted by the first surface strikes the second surface at an angle, with respect to the normal, greater than the critical angle. This critical angle is defined as the arc sine of the ratio of the index of refraction of the surrounding medium (typically air) to that of the wall material. In addition, a significant portion of the incident light striking the surfaces 212 or 214 outside the acceptable angular range, will be transmitted and the remainder will be reflected, as illustrated in FIGS. 8 and 9. In either situation, there is negligible absorption of light by the wall material.

The structured surface 212 includes a linear array of substantially right angled isosceles prisms 216 arranged side-by-side in parallel relationship to form a plurality of grooves 218 running the length of the light conduit 210, as illustrated in FIGS. 8 and 9. The perpendicular sides 220 are nominally flat and make an angle alpha ($\alpha$), of approximately 45°, with the tangent to the adjacent smooth surface 214.

An alternative to the prismatic light conduits is shown in U.S. Pat. No. 5,067,831 (the '831 patent). The '831 patent shows an example of a bendable light conduit comprising a light transport zone bounded by a light confining surface. The '831 patent shows a heat shrink clad core optical conduit having either a thermoplastic, thermoset or liquid, light transmitting core surrounded by preferably a fluoropolymer cladding, which is in turn surrounded by a tight-fitting, outer polymer jacket which may be opaque, transparent or translucent, and is preferably made of a durable polymer such as polyethylene or polycarbonate.

The term optical conduit is used to refer to a conduit that includes a core which is sheathed with a cladding and the composition of the core and cladding conducts, (i.e. transmits), light or electromagnetic energy ranging from the infrared through the visible to and including the ultraviolet region of the electromagnetic spectrum by the principle of total internal reflection, as is well known to those skilled in the art.

Suitable solid-core optical conduits include those in which the conduit or core is surrounded by a shrunk, heat shrinkable tube, such as a fluoropolymer including Teflon® to provide a snug, uniform cladding around the core, and a relatively thin, minimized, uniform gap between the cladding and the core. The clad, optical conduit may be made in conventional reactors whereby a conventional monomer mixture is placed inside of expanded, heat shrinkable tubing, which in turn has been placed and secured snugly within another tube, or manufacturing jacket made of a durable, relatively thick material; progressively polymerized from one end to the other to form a flexible core in a manner so as not to shrink the heat shrinkable tube to its fully shrunk condition prior to when the monomer mixture has achieved the degree of polymerization desired for the core while it remains in the reactor; removing the assembly containing manufacturing jacket and heat shrinkable tubing containing the polymer core from the reactor; removing the manufacturing jacket; and applying heat to the heat shrinkable tubing containing the polymeric core to cause it to shrink and form a snug fit clad around the polymeric core. Alternatively, the core may be made of other optically conductive material such as, for example, optical quality glass and various liquids. The heat shrink cladding surrounding the core provides a clad, optical conduit having improved optical transmission and emission properties both in straight or bent configurations.

These and other suitable light conduits are used to provide an area source of light at the distal end of the pole light.

Pole Light

The present invention also provides an apparatus for transporting light. Such an apparatus may be used as, for example, a pole light positioned along a roadway, highway, or a parking lot. A pole light will include a light source typically provided in a base portion. The base portion is adapted to be positioned either submerged in, or on top of, the ground. A columnar light conduit, such as that described in the '984 patent, extends from the base portion, typically positioned so as to extend vertically from the ground. It is preferable that the base portion include an accessible box portion having one or more light bulbs or other sources of light. Thus, the light bulb or bulbs may be easily replaced by one person, without the need for ladders, hoists, or other apparatus typically required to change a bulb positioned on top of a pole light. The bulbs may be of one or more colors, and may be activatable so as to provide different colors of light at the distal end of the light conduit.

The light emitted from the light source at the base or proximate end of the light conduit is transported through the light conduit and is provided as a quasi-collimated source of light emanating from the distal end of the light conduit. The light could also be located elsewhere in the light conduit, as desired, and proximate end, as used herein, will refer to the end of that portion of light conduit where the light source is located.

Light Distributing Members

The present invention provides light distributing members positioned at the top of a light conduit to distribute light in a predetermined and precise pattern onto a surface proximate to the pole light. The light distributing members of the present invention receive quasi-collimated light from the distal end of the light conduit and through refractive and reflective elements precisely direct the light to illuminate the predetermined area proximate to the pole light.

The present invention provides three general embodiments for light distributing members. The first embodiment provides a light mask that blocks a certain portion of the light entering the light distributing member. The light mask is placed in the path of the area source of light emanating from the distal end of the light conduit. The light distributing member also includes one or more lenses and optionally one or more reflective elements. The reflective elements may optionally have power to further focus the light. A portion of the light that is permitted to pass through the mask is focused by the one or more lenses, and optionally reflected by the one or more reflective elements, to provide the desired precise and predetermined illuminated pattern on a surface proximate to the pole. The aperture of the mask may be in any desired shape, including arrows, numbers, rectangles, and the like.

In a second embodiment, the light distributing member comprises a plurality of prismatic elements, each having a desired focal length, positioned relative to one another so as to focus the area source of light in a precise and predetermined pattern on a surface proximate to the pole. Optional reflective members may also be utilized to reflect the light focused by the plurality of lenslets. FIGS. 3 and 6 show two structures utilizing prismatic elements.

The present invention also provides a third embodiment of a light reflective member that comprises a) a primary light conduit and one or more auxiliary light conduits, typically extending generally perpendicular from the primary light conduit; b) one or more reflective elements to reflect the area source of light and c) one or more reflective elements positioned adjacent to light exit ports provided in said auxiliary light conduit. Reflective elements may have power as desired. The reflective elements are preferably total internal reflection prisms, e.g., as shown in Cobb, U.S. Pat. No. 5,040,883. An optional lens may be positioned adjacent to or integral with the reflective element (e.g., the total internal reflection prisms).

Traffic Management and Guidance System

The pole lights of the present invention are useful in a traffic management and guidance system. A wide variety of configurations of the pole lights of the present invention may be utilized in combination to light the plurality of the desired regions on a surface in a precise and predetermined pattern. Such patterns may also be programmed so as to be changeable. A plurality of pole lights of the present invention can be arranged so as to provide a pattern that illuminates the desired regions on a surface, such as a roadway. For example, a left turn arrow can be projected onto a roadway, preferably only when left turns are permitted. Another example of a traffic management and guidance system would be one that provides a plurality of pole lights that illuminate a series of rectangles positioned so as to appear as a dividing line, or indicator line, on a roadway. Other patterns or shapes can be programmed so that when a plurality of pole lights of the present invention are positioned along a roadway or other area, the desired traffic management effect is achieved.

The present invention may also be utilized in other lighting systems, unrelated to traffic or roadways. For example, a plurality of pole lights may be utilized as a lighting system in a museum to direct a precise portion of light onto a piece of art. A wide variety of other lighting systems are possible when the pole lights of the present invention are utilized.

We claim:

1. A pole light for delivering light in a desired pattern to a surface proximate to the pole light, said pole light comprising:

(a) a light conduit having a proximate end and a distal end;

(b) the distal end of said light conduit serving as an area source of quasi-collimated light;

(c) a light distributing member further distal from said area source of light, said light distributing member comprising a plurality of prismatic elements positioned relative to one another so as to direct portions of said area source of light to illuminate a surface proximate to said pole light in a precise and predetermined pattern, said prismatic elements selected from the group consisting of reflective prismatic elements and refractive prismatic elements.

2. The pole light of claim 1 wherein said light conduit comprises a bendable light conduit comprising a light transport zone bounded by a light confining surface.

3. The pole light of claim 2 wherein said light conduit comprises: a monofilament, light transmitting core selected from the group consisting of thermoplastic and thermoset polymers surrounded by; a fluoropolymer clad surrounded by; a jacket made of a polymer which has been extruded from the fluoropolymer core; whereby said light conduit is capable of emitting light circumferentially, transverse to the conduit length.

4. The pole light of claim 1 wherein said light conduit comprises a wall member of a transparent material, said wall member including a structured surface on one side and a smooth surface opposite said structured surface on the other side, at least a portion of the cross-section of said wall member lying in a smooth arcuate curve, said structured surface having a linear array of substantially right angled isosceles prisms arranged side-by-side, the perpendicular sides of said prisms making an angle of approximately 45° with the tangent to said smooth surface opposite said structured surface, so that a predetermined portion of the light entering the light conduit within an acceptable angular range, is contained by total internal reflection as said light travels along from the proximate end to the distal end of the light conduit.

5. The pole light of claim 4 wherein said wall member is substantially circular in cross-section and said smooth surface is disposed on the inner side of said wall member and said prisms run parallel to the axis of said wall member.

6. A pole light for delivering light in a desired pattern to a surface proximate to the pole light, said pole light comprising:

(a) a light conduit having a proximate end and a distal end;

(b) the distal end of said light conduit serving as an area source of quasi-collimated light;

(c) a light distributing member that includes 1) one or more auxiliary light conduits, 2) one or more reflective elements to direct the area source of light into said one or more auxiliary light conduits; and 3) one or more reflective elements having optical power positioned adjacent to each of one or more light exit ports provided in said auxiliary light conduit;

wherein the light reflected from said light distributing member illuminates a surface proximate to said pole light in a precise and predetermined pattern.

* * * * *